(12) United States Patent
Abussaud et al.

(10) Patent No.: US 10,399,866 B2
(45) Date of Patent: *Sep. 3, 2019

(54) METHOD FOR REMOVING P-XYLENE FROM AQUEOUS COMPOSITIONS

(71) Applicant: King Fand University of Petroleum and Minerals, Dhahran (SA)

(72) Inventors: Basim Ahmed Abussaud, Dhahran (SA); Aamir Abbas, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 41 days.

This patent is subject to a terminal disclaimer.

(21) Appl. No.: 15/893,844

(22) Filed: Feb. 12, 2018

(65) Prior Publication Data
US 2018/0162750 A1 Jun. 14, 2018

Related U.S. Application Data

(63) Continuation of application No. 15/018,898, filed on Feb. 9, 2016, now Pat. No. 9,981,863.

(51) Int. Cl.
*C02F 1/32* (2006.01)
*B01J 19/12* (2006.01)
(Continued)

(52) U.S. Cl.
CPC .............. *C02F 1/325* (2013.01); *B01J 19/123* (2013.01); *C02F 1/283* (2013.01); *C02F 1/32* (2013.01);
(Continued)

(58) Field of Classification Search
CPC .. C02F 1/325; C02F 1/283; C02F 1/32; C02F 2305/08; C02F 2201/3222; C02F 2101/32; B01J 19/123
(Continued)

(56) References Cited

U.S. PATENT DOCUMENTS

| 5,501,801 A | 3/1996 | Zhang | |
| 9,078,942 B2 * | 7/2015 | Yao | ................ B82Y 30/00 |

(Continued)

FOREIGN PATENT DOCUMENTS

| CN | 1002120177 B | 12/2012 |
| WO | WO 2005/081722 A2 | 9/2005 |

OTHER PUBLICATIONS

Kang et al, "Visible Light- or UV-Activated Carbon Nanotube-TiO2 Composite Nanofibers for Indoor BTEX Purification," Asian J. of Chem. vol. 26, No. 6 (2014) pp. 1803-1807 (Year: 2014).*

(Continued)

*Primary Examiner* — Nicholas A Smith
*Assistant Examiner* — Colleen M Raphael
(74) *Attorney, Agent, or Firm* — Oblon, McClelland, Maier & Neustadt, L.L.P.

(57) ABSTRACT

A method of removing at least one single ring aromatic hydrocarbon from a hydrocarbon contaminated fluid. The method includes contacting the hydrocarbon contaminated fluid with carbon nanotubes to adsorb the at least one single ring aromatic hydrocarbon while exposing the hydrocarbon contaminated fluid and the carbon nanotubes to UV irradiation from at least one UV light source, preferably a UV light emitting diode (LED), with a wavelength of about 315-415 nm, preferably about 365 nm, to form a treated fluid having a reduced concentration of the at least one single ring aromatic hydrocarbon relative to the hydrocarbon contaminated fluid.

9 Claims, 1 Drawing Sheet

(51) Int. Cl.
*C02F 1/28* (2006.01)
*C02F 101/32* (2006.01)

(52) U.S. Cl.
CPC .. *C02F 2101/32* (2013.01); *C02F 2201/3222* (2013.01); *C02F 2305/08* (2013.01)

(58) Field of Classification Search
USPC .................................................. 204/158.21
See application file for complete search history.

(56) References Cited

U.S. PATENT DOCUMENTS 9,096,450 B2    8/2015    Andrews
2015/0315048 A1    11/2015    Blanco Tirado

OTHER PUBLICATIONS

Reti et al, "Substrate dependent photocatalytic performance of TiO2/MWCNT photocatalysts," Applied Catalysis A: General 469 (2014) pp. 153-158 (Year: 2014).*

Silva et al, "Photocatalytic oxidation of benzene derivatives in aqueous suspensions: Synergic effect induced by the introduction of carbon nanotubes in a TiO2 matrix," Applied Catalysis B: Environmental 101 (2010) pp. 81-89 (Year: 2010).*

Hamidreza Pourzamani, et al., "Performance of raw and regenerated multi- and single-walled carbon nanotubes in xylene removal from aqueous solutions", International Journal of Environmental Health Engineering, vol. 1, Issue 1, Jan.-Mar. 2012, pp. 20-23.

Fei Yu, et al, "Kinetic and Thermodynamic Studies of Toluene. Ethylbenzene. And m-Xylene Adsorption from Aqueous Solutions onto KOH-Activated Multiwalled Carbon Nanotubes" Journal of Agricultural and Food Chemistry, vol. 60, No. 50, 2012, pp. 12245-12253.

Ching-Ju Monica Chin. et al., "Adsorption of o-xylene and p-xylene from water by SWCNTs", Carbon, vol. 45, No. 6, 2007, pp. 1254-1260.

Cantarella et al, "Immobilization of nanomaterials in PMMA composites for photocatalytEC removal of dyes, phenols arid bacteria from water," J. of Photochemistry and Photobiology A: Chemistry 321 (2016).

Reti et al, "Substrate dependent photocatalytic performance of TiO2N/WCNT photocatalysts," Applied Catalysis A: General 469 (2014) pp. 153-158.

Silva et al, "Photocatalytic oxidation of benzene derivatives in aqueous suspensions: Synergic effect induced by the introduction of carbon nanotubes in a TiO2 matrix," Applied Catalysis B: Environmental 101 (2010) pp. 81-89.

* cited by examiner

METHOD FOR REMOVING P-XYLENE FROM AQUEOUS COMPOSITIONS

CROSS REFERENCE TO RELATED APPLICATIONS

This application is a Continuation of and is based upon and claims the benefit of priority under 35 U.S.C. § 120 for U.S. Ser. No. 15/018,898, having a filing date of Feb. 9, 2016, the entire contents of which are incorporated herein by reference.

BACKGROUND OF THE INVENTION

Technical Field

The present disclosure relates to methods of removing single ring aromatic hydrocarbons, such as para-xylene, from a hydrocarbon contaminated fluid. More specifically, the present disclosure relates to a method of removing single ring aromatic hydrocarbons from a hydrocarbon contaminated fluid using carbon nanotubes to adsorb the single ring aromatic hydrocarbons together with UV irradiation, preferably from a UV light emitting diode (LED), to oxidize and degrade the single ring aromatic hydrocarbons in the hydrocarbon contaminated fluid and adsorbed on the carbon nanotubes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Single ring aromatic hydrocarbons, such as benzene, toluene, ethylbenzene, and the three isomers of xylene i.e. para-xylene, meta-xylene, and ortho-xylene, or BTEX, are petroleum hydrocarbons. For example, BTEX constitutes about 18 wt % of total hydrocarbons in gasoline. Compared with aliphatic hydrocarbons, aromatic hydrocarbons, including single ring aromatic hydrocarbons, are more toxic. For example, inhaling para-xylene can cause dizziness, headache, drowsiness, and nausea. Long term exposure to para-xylene can cause developmental defects and damage the central nervous and reproductive systems. Thus, single ring aromatic hydrocarbons pose a serious health risk to humans when they enter into soil and groundwater due to, for example, leaking oil tanks, blowouts, and improper discharge of petroleum hydrocarbons and untreated waste water from the petro-chemical industry. Conventional methods for removing single ring, aromatic hydrocarbons include coagulation and flocculation, however, they are often ineffective.

It is thus an object of the present disclosure to provide a simple, and yet efficient and effective method for removing single ring aromatic hydrocarbons from a hydrocarbon contaminated fluid, such as a para-xylene containing aqueous solution, using a combination of adsorption with carbon nanotubes and UV irradiation.

BRIEF SUMMARY OF THE INVENTION

The present disclosure relates to a method of removing at least one single ring aromatic hydrocarbon from a hydrocarbon contaminated fluid. The method includes contacting the hydrocarbon contaminated fluid with carbon nanotubes to adsorb the at least one single ring aromatic hydrocarbon while exposing the hydrocarbon contaminated fluid and the carbon nanotubes to UV irradiation from at least one UV light source with a wavelength of about 315-415 nm to form a treated fluid having a reduced concentration of the at least one single ring aromatic hydrocarbon relative to the hydrocarbon contaminated fluid.

In one or more embodiments, the at least one single ring aromatic hydrocarbon is at least one selected from the group consisting of benzene, toluene, ethylbenzene, ortho-xylene, meta-xylene, para-xylene, cumene, and styrene, and derivatives thereof.

In one or more embodiments, the hydrocarbon contaminated fluid is an aqueous solution, the at least one single ring aromatic hydrocarbon is para-xylene, and the method reduces the concentration of para-xylene in the aqueous solution by at least 30% in less time than a substantially similar method without contacting the aqueous solution with the carbon nanotubes.

In one or more embodiments, the hydrocarbon contaminated fluid is an aqueous solution, the at least one single ring aromatic hydrocarbon is para-xylene, and the method reduces the concentration of para-xylene in the aqueous solution by at least 30% in less time than a substantially similar method without exposing the aqueous solution and the carbon nanotubes to the UV irradiation.

In one or more embodiments, the hydrocarbon contaminated fluid is an aqueous solution, the at least one single ring aromatic hydrocarbon is para-xylene, and the reduced concentration of the para-xylene in the treated fluid is at least 95% reduced relative to the hydrocarbon contaminated fluid.

In one or more embodiments, the carbon nanotubes comprise unmodified carbon nanotubes, modified carbon nanotubes, or a combination of unmodified carbon nanotubes and modified carbon nanotubes.

In one or more embodiments, the carbon nanotubes have an outer diameter ranging from about 8 nm to 80 nm.

In one or more embodiments, the amount of the carbon nanotubes contacting the hydrocarbon contaminated fluid ranges from about 0.2 g/L to 1 g/L of the hydrocarbon contaminated fluid.

In one or more embodiments, the hydrocarbon contaminated fluid has a pH of about 6-8 before the contacting and the exposing.

In one or more embodiments, the at least one UV light source comprises a light emitting diode (LED).

In one or more embodiments, the hydrocarbon contaminated fluid is contacted with the carbon nanotubes while the hydrocarbon contaminated fluid and the carbon nanotubes are exposed to the UV irradiation at a temperature of about 20-30° C. and a pressure of about 0.5-1.5 bar.

In one or more embodiments, a plurality of the carbon nanotubes is in a powder form.

In one or more embodiments, the contacting forms adsorbed carbon nanotubes comprising at least one single ring aromatic hydrocarbon and the method further comprises removing the adsorbed carbon nanotubes from the treated fluid.

In one or more embodiments, the contacting forms adsorbed carbon nanotubes comprising at least one single ring aromatic hydrocarbon and the method further comprises removing the adsorbed carbon nanotubes from the treated fluid and regenerating the adsorption ability of the adsorbed carbon nanotubes.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

The present disclosure provides a method of removing at least one single ring aromatic hydrocarbon from a hydrocarbon contaminated fluid. The method includes contacting the hydrocarbon contaminated fluid with carbon nanotubes to adsorb the at least one single ring aromatic hydrocarbon while exposing the hydrocarbon contaminated fluid and the carbon nanotubes to UV irradiation from at least one UV light source with a wavelength of about 315-415 nm to form a treated fluid having a reduced concentration of the at least one single ring aromatic hydrocarbon relative to the hydrocarbon contaminated fluid.

Non-limiting examples of the at least one single ring aromatic hydrocarbon include benzene, toluene, ethylbenzene, ortho-xylene, meta-xylene, para-xylene, cumene, and styrene, and their respective derivatives. Toluene, ethylbenzene, ortho-xylene, meta-xylene, para-xylene, cumene, and styrene are in fact hydrocarbon derivatives of benzene. Other derivatives of benzene removable by the disclosed method may include, without limitation, halogen-containing benzene derivatives, e.g. fluorobenzene, chlorobenzene, bromobenzene, and iodobenzene; oxygen-containing benzene derivatives, e.g. phenol, benzoic acid, benzaldehyde, acetophenone, methyl benzoate, and anisole; nitrogen-containing benzene derivatives, e.g. aniline, nitrobenzene, benzonitrile, and benzamide; and sulfur-containing benzene derivatives, e.g. benzenesulfonic acid. Likewise, halogen-containing derivatives, hydrocarbon derivatives, oxygen-containing derivatives, nitrogen-containing derivatives, and sulfur-containing derivatives of toluene, ethylbenzene, ortho-xylene, meta-xylene, para-xylene, cumene, and styrene may also be removed by the disclosed method.

In one embodiment, the hydrocarbon contaminated fluid is a single ring aromatic hydrocarbon containing liquid, such as an aqueous solution. For example, the hydrocarbon contaminated fluid may be at least one selected from the group consisting of a refinery industry effluent, a chemical industry effluent, waste water, ground water, river water, lake water, water that has been contacted with sediment and soil contaminated with single ring aromatic hydrocarbons. In another embodiment, the hydrocarbon contaminated fluid is a single ring aromatic hydrocarbon containing gas. In still another embodiment, the hydrocarbon contaminated fluid is a mixture of at least one single ring aromatic hydrocarbon containing liquid and at least one single ring aromatic hydrocarbon containing gas.

In some embodiments, the hydrocarbon contaminated fluid has a pH of 1-14, 3-12, preferably 3-10, preferably 5-10, or more preferably 6-8 before the contacting and exposing. In some embodiments, the hydrocarbon contaminated fluid pH is adjusted such that the single ring aromatic hydrocarbon(s) are positively charged, for example, the single ring aromatic hydrocarbons have one or more protonated amine groups, whereas the carbon nanotubes, particularly the modified carbon nanotubes, for example, with carboxylate and/or phosphate groups, have a negative surface charge (typically at a neutral or basic pH) to achieve a higher adsorption efficiency due to a stronger electrostatic interaction between the single ring aromatic hydrocarbon(s) and the surface of the carbon nanotubes.

The carbon nanotubes may be single-walled carbon nanotubes and/or multi-walled carbon nanotubes. In some embodiments, the multi-walled carbon nanotubes may have a structure conforming to the Russian Doll model, i.e. they contain sheets of graphite arranged in concentric cylinders. In other embodiments, the multi-walled carbon nanotubes have a structure conforming to the Parchment model, i.e. they contain a single sheet of graphite rolled in around themselves and resemble a scroll of parchment.

In some embodiments, the carbon nanotubes have an outer diameter of about 1-100 nm, preferably about 5-90 nm, preferably about 8-80 nm, preferably about 10-70 nm, preferably about 15-60 nm, or more preferably about 20-50 nm, or more preferably 30-40 nm.

In one embodiment, the carbon nanotubes are unmodified, or raw, carbon nanotubes. In another embodiment, the carbon nanotubes are modified or functionalized carbon nanotubes that preferably have an enhanced adsorption capacity for the single ring aromatic hydrocarbon(s). Non-limiting examples of such modified carbon nanotubes include multi-walled carbon nanotubes oxidized by NaOCl, disclosed by. Chinese Patent No. CN102120177 B, and incorporated herein by reference in its entirety; multi-walled carbon nanotubes activated by KOH, disclosed by Fei Yu, Yanqing Wu, Xiaoman Li, and Jie Ma, Kinetic and Thermodynamic Studies of Toluene, Ethylbenzene, and m-Xylene Adsorption from Aqueous Solutions onto KOH-Activated Multiwalled Carbon Nanotubes, J. Agric. Food Chem., 2012, 60 (50), pp 12245-12253, and incorporated herein by reference in its entirety; and single-walled carbon nanotubes treated with nitric acid, disclosed in Chin, Ching-Ju Monica; Shih, Li-Chieh; Tsai, Hen-Je: Liu, Ta-Kang. Adsorption of o-xylene and p-xylene from water by SWCNTs, CARBON, 45, (6), pp 1254-1260, 2007/05, and incorporated herein by reference in its entirety. In still another embodiment, the carbon nanotubes are a combination of unmodified carbon nanotubes and at least one type of modified carbon nanotubes. The mass ratio of the unmodified carbon nanotubes to the at least one type of modified carbon nanotubes, and the mass ratio among different types of the modified carbon nanotubes may vary without limitation, depending on the availability and cost considerations of the unmodified versus the modified carbon nanotubes and whether the conditions of the hydrocarbon contaminated fluid, e.g. the fluid pH and the initial concentration of the single ring aromatic hydrocarbon(s) in the fluid, favor and/or necessitate the adsorption by the modified carbon nanotubes, etc. In a preferred embodiment, the conditions of the fluid, for example, the pH of the fluid, are adjusted for the maximal adsorption by the modified carbon nanotubes, and the mass ratio of the modified carbon nanotubes to the unmodified carbon nanotubes is at least 1:1, more preferably from 1:1 to 10:1 since the modified carbon nanotubes generally have a higher adsorption capacity for the single ring aromatic hydrocarbons than the unmodified carbon nanotubes. Additionally, when the unmodified carbon nanotubes are combined with the modified carbon nanotubes, the unmodified carbon nanotubes may form a separate layer or section from the modified carbon nanotubes, for example, in a fixed bed reactor, or the unmodified carbon nanotubes and the modified carbon nanotubes may freely mingle with each other, for example, in a fixed bed reactor, in a batch adsorption vessel, or in a fluidized bed reactor.

The UV irradiation, preferably in the presence $O_2$, oxidizes and degrades the single ring aromatic hydrocarbons both in the hydrocarbon contaminated fluid and adsorbed on the carbon nanotubes by converting $O_2$ to $O_3$ that in turn produces highly reactive hydroxyl radicals. The $O_2$, may be from atmospheric air and/or other sources, such as an $O_2$ gas tank, from which $O_2$ may be pumped or injected into the fluid.

Some oxidation and degradation products of the single ring aromatic hydrocarbons by the UV irradiation may be oxygen-containing derivatives of the single ring aromatic hydrocarbons that include, without limitation, phenol, benzoic acid, benzaldehyde, acetophenone, methyl benzoate, and anisole. Other oxidation and degradation products of the single ring aromatic hydrocarbons may include deep oxidation products such as carbon dioxide and water. For example, Perumal Devaraji, Naveen K. Sathu, and Chinnakonda S. Gopinath showed UV oxidation of benzene to phenol in "Ambient Oxidation of Benzene to Phenol by Photocatalysis on $Au/Ti_{0.98}V_{0.02}O_2$: Role of Holes," ACS Catal., 2014, 4 (9), pp 2844-2853, incorporated herein by reference in its entirety. For another example, UV irradiation can oxidize m-xylene to form benzaldehyde, acetophenone, benzoylformic acid, benzoic acid, $CO_2$, and water, as disclosed by Yi-Ting Wu, Yi-Hui Yu, Van-Huy Nguyen, Kung-Te Lu, Jeffrey Chi-Sheng Wu, Luh-Maan Chang, Chi-Wen Kuo, Enhanced xylene removal by photocatalytic oxidation using fiber-illuminated honeycomb reactor at ppb level, Journal of Hazardous Materials 262 (2013) 717-725, incorporated herein by reference in its entirety. According to the disclosed method, all or a portion of the oxidation and degradation products of the single ring aromatic hydrocarbons may be advantageously adsorbed by the carbon nanotubes (raw and/or modified) and/or other adsorbents that can be included in additional to the carbon nanotubes as described below. For example, carbon nanotubes, preferably carbon nanotubes impregnated with aluminum oxide or ferric oxide, can efficiently remove phenol from an aqueous solution, as disclosed by Ihsanullaha, Hamza A; Asmalya, Tawfik A; Salehb, Tahar Laouie, Vinod Kumar Gupta, and Muataz Ali Atiehd, Enhanced adsorption of phenols from liquids by aluminum oxide/carbon nanotubes: Comprehensive study from synthesis to surface properties, Journal of Molecular Liquids, Volume 206, June 2015, Pages 176-182; and by Hamza A. Asmalya, Basim Abussaudb, Ihsanullahb, Tawfik A. Salehc, Vinod Kumar Guptad, and Muataz Ali Atieh, Ferric oxide nanoparticles decorated carbon nanotubes and carbon nanofibers: From synthesis to enhanced removal of phenol, Journal of Saudi Chemical Society, Volume 19, Issue 5, September 2015, Pages 511-520; each incorporated herein by reference in its entirety.

In one embodiment, the at least one UV light source comprises a mercury lamp. In a preferred embodiment, the at least one UV light source comprises a light emitting diode (LED). Compared with a mercury UV lamp, a UV LED has a narrower spectral output centered around a specific wavelength, e.g. ±10 nm. Additionally, a UV LED converts the input electrical power into useful UV light more efficiently than a mercury UV lamp by generating less heat and light at unwanted wavelengths, e.g. infrared light. Further, a UV LED has a tighter emission angle than a mercury UV lamp, allowing the majority of the UV output to be focused directly where it is required.

In some embodiments, the UV irradiation has a wavelength of 290-430 nm, preferably 315-415 nm, more preferably 330-395 nm, or more preferably 350-385 nm, or more preferably 360 nm.

The power of any single UV light source, or the total power of a plurality of the UV light sources, and the number of the UV light sources may vary widely, depending on the volume of the hydrocarbon contaminated fluid being treated, the initial concentration of the single ring aromatic hydrocarbon(s) in the hydrocarbon contaminated fluid, the type of the UV light source used (e.g. a mercury UV lamp or a UV LED), the way the UV light sources are placed, e.g. the distance between the UV light source and a UV irradiation target area of the hydrocarbon contaminated fluid and the carbon nanotubes and the distribution of the UV light in the fluid and the carbon nanotubes, the single ring aromatic hydrocarbon removal efficiency desired, the single ring, aromatic hydrocarbon removal efficiency obtainable by the adsorption with the carbon nanotubes alone, the single ring aromatic hydrocarbon removal speed, or rate, desired, whether a photocatalyst for UV oxidation and degradation of the single ring aromatic hydrocarbon(s) is present, etc. In some embodiments, the power of the UV light source, preferably a UV LED, is about 10-100 W per liter of the hydrocarbon contaminated fluid, about 20-90 W per liter of the hydrocarbon contaminated fluid, about 30-80 W per liter of the hydrocarbon contaminated fluid, about 40-70 W per liter of the hydrocarbon contaminated fluid, or about 50-60 W per liter of the hydrocarbon contaminated fluid, or preferably about 20 W per liter of the hydrocarbon contaminated fluid.

The amount of the carbon nanotubes per unit volume of the hydrocarbon contaminated fluid to adsorb the single ring aromatic hydrocarbon(s) from the hydrocarbon contaminated fluid can vary, depending on the initial concentration of the single ring aromatic hydrocarbon(s) in the hydrocarbon contaminated fluid, which typically ranges from 10 mg/L to 100 mg/L, the removal efficiency required, the availability of the carbon nanotubes, the type of the carbon nanotubes used (e.g. unmodified or modified carbon nanotubes), the capacity for the treatment of the hydrocarbon contaminated fluid with the carbon nanotubes, e.g. the size of a vessel used for batch adsorption, and the capacity for filtration of the carbon nanotubes from the treated fluid, etc. A typical amount of the carbon nanotubes treating the hydrocarbon contaminated fluid ranges from about 0.1 g/L to 2 g/L, from 0.15 g/L to 1.5 g/L, from 0.2 g/L to 1 g/L, from 0.4 g/L to 0.8 g/L, from 0.5 g/L to 0.7 g/L, of the hydrocarbon contaminated fluid.

In one embodiment, the contacting of the hydrocarbon contaminated fluid with the carbon nanotubes to adsorb the single ring aromatic hydrocarbon may be performed in a batch adsorption fashion, for example by mixing an appropriate amount of the carbon nanotubes with a certain volume of the hydrocarbon contaminated fluid based on the ranges of the carbon nanotube amount per unit volume of the hydrocarbon contaminated fluid described above, preferably with the mixture under constant agitation (e.g. stirring, shaking, or vortexing), while exposing the mixture to the UV irradiation. In some embodiments, the UV light source may be placed in such a way that it is not in direct contact with the hydrocarbon contaminated fluid/carbon nanotube mixture, for example, the UV light source may be placed on top of, on a side of, and/or underneath a vessel containing the mixture, with the UV light traveling from the UV light source to reach the mixture, or a portion thereof, preferably unimpeded, and with the vessel walls preferably made of materials transparent to the UV light, e.g. UV transparent glass or plastic. The distance between the UV light source and a UV irradiation target area of the mixture may vary, depending on the desired power level or intensity of the UV light the hydrocarbon contaminated fluid and the carbon nanotubes are exposed to and the desired UV light coverage of the hydrocarbon contaminated fluid and the carbon nanotubes. The UV light source may be stationary or may be in motion to increase the UV light coverage of the hydrocarbon contaminated fluid and the carbon nanotubes. In other embodiments, the UV light source may be placed in a way that it is in direct contact with the hydrocarbon contaminated fluid/carbon nanotube mixture, for example, the UV light source may be immersed in the mixture of the hydrocarbon contaminated fluid and the carbon nanotubes. The UV light source may be stationary or may be in motion. These are preferred embodiments when more power of the UV light is desired to reach and/or penetrate the hydrocarbon contaminated fluid and the carbon nanotubes.

Besides batch adsorption, granular particles of the carbon nanotubes may be installed in a fixed bed reactor or fluidized bed reactor. For example, the hydrocarbon contaminated fluid containing the single ring aromatic hydrocarbon(s) can be applied to a fixed bed column or reactor of the carbon nanotubes while the hydrocarbon contaminated fluid and the carbon nanotubes are exposed to the UV irradiation from the UV light source, which can be stationary or in motion and which may be placed in direct contact with the hydrocarbon contaminated fluid/carbon nanotube mixture or not, and the effluent of the column or reactor comprises the treated fluid with reduced concentrations of the single ring aromatic hydrocarbon(s). In some embodiments, the fixed bed reactor of the carbon nanotubes comprises a cartridge for easy carry and use. For example, such a cartridge can be attached to a faucet of ground water, or installed in a container where (waste) water containing the single ring aromatic hydrocarbon(s) passes through the cartridge from an upper level of the container, with the treated (waste) water exiting the cartridge at a lower level of the container with reduced concentrations of the single ring aromatic hydrocarbon(s). Further, the batch adsorption, the fixed bed reactor and cartridge, and the fluidized bed reactor described below can include other adsorbents besides carbon nanotubes, such as activated carbon, graphite, activated alumina, a molecular sieve, aluminophosphate material, silicoaluminophosphate material, zeolites, faujasite, clinoptilolite, mordenite, metal-exchanged silicoaluminophosphate, uni-polar resin, bi-polar resin, aromatic cross-linked polystyrenic matrix, brominated aromatic matrix, acrylic polymer, acrylic copolymer, methacrylic polymer, methacrylic copolymer, hydroxyalkyl acrylate, hydroxyalkyl methacrylate, adsorbent carbonaceous material, adsorbent graphitic material, carbon fiber material, nano-material, adsorbent metal salts (including, but not limited to perchlorates, oxalates, and alkaline earth metals), alkaline earth metal metallic particles, ion exchange resin, linear polymers of glucose, polyacrylamide, or a combination thereof, to adsorb the single ring aromatic hydrocarbon(s), the degradation and oxidation products of the single ring aromatic hydrocarbon(s) that may also be toxic, and other harmful substances in the hydrocarbon contaminated fluid, e.g. heavy metal ions and dyes.

Alternatively, the carbon nanotubes can form a fluidized bed reactor with the hydrocarbon contaminated fluid containing the single ring aromatic hydrocarbon(s), for example, by introducing the pressurized hydrocarbon contaminated fluid, either in a liquid form, or in a gaseous form, or in a mixed liquid and gaseous form, through the particulate medium of the carbon nanotubes. In the fluidized bed reactor, contact between the carbon nanotubes and the hydrocarbon contaminated fluid is greatly enhanced as compared to a fixed bed column or reactor, leading to a higher adsorption efficiency of the single ring aromatic hydrocarbon(s) from the hydrocarbon contaminated fluid. In a fluidized bed reactor, the UV light source can be likewise stationary or in motion and can be placed in direct contact or not with the hydrocarbon contaminated fluid/carbon nanotube mixture.

The time during which the hydrocarbon contaminated fluid contacts the carbon nanotubes while the hydrocarbon contaminated fluid and the carbon nanotubes are exposed to the UV irradiation may vary, depending on, without limitation, the adsorption mode (e.g. batch adsorption, fixed bed reactor type, or fluidized reactor type), and the adsorption conditions (e.g. the agitation speed, the amount and type of the carbon nanotubes, and the temperature and the fluid pH of the batch adsorption), the power and type of the UV light source, and the distribution and intensity of the UV light the hydrocarbon contaminated fluid and the carbon nanotubes are exposed to, the initial concentration of the single ring aromatic hydrocarbon(s) in the hydrocarbon contaminated fluid, the types of the single ring aromatic hydrocarbons, whether photocatalysts are present, the amount and type of the photocatalysts, and the removal efficiency desired. In some embodiments, the contacting and the exposing time is 5-200 minutes, or 10-180 minutes, or 20-150 minutes, or 30-120 minutes, or 40-100 minutes, to achieve a single ring, aromatic hydrocarbon removal percentage of at least 50%, at least 60%, at least 70%, at least 80%, at least 90%, or at least 95%.

In some embodiments, the hydrocarbon contaminated fluid is an aqueous solution, the single ring aromatic hydrocarbon is para-xylene, and the reduced concentration of the para-xylene in the treated fluid is at least 60%, at least 70%, at least 80%, at least 90%, or at least 95% reduced relative to the hydrocarbon contaminated fluid, preferably after a first 5-60 minutes, or a first 10-50 minutes, or a first 15-40 minutes, or a first 20-30 minutes of the contacting and the exposing.

The disclosed method for removing single ring aromatic hydrocarbons from a hydrocarbon contaminated fluid is advantageous in that it is more efficient and environmentally friendly than removing single ring aromatic hydrocarbons from a hydrocarbon contaminated fluid by adsorption with the carbon nanotubes alone or by UV irradiation alone, not only because of the simultaneous removal of the single ring aromatic hydrocarbons by the separate actions of adsorption and irradiation, but also because of the collaboration between the two actions. The single ring aromatic hydrocarbon molecules adsorbed by the carbon nanotubes can be subsequently oxidized and degraded by the UV irradiation, making the previously occupied adsorption sites available again for new single ring aromatic hydrocarbon molecules and prolonging the time period of a high adsorption rate. On the other hand, some of the oxidation degradation products of the single ring aromatic hydrocarbons that may still be toxic may be adsorbed by the carbon nanotubes, making the treated fluid even more harmless to humans and the environment.

In some embodiments, the hydrocarbon contaminated fluid is an aqueous solution, the at least one single ring aromatic hydrocarbon is para-xylene, and the reduced concentration of the para-xylene in the treated aqueous solution is at least about 40% lower, at least about 50% lower, at least about 60% lower, at least about 70% lower, at least about 80% lower, or at least about 90% lower, after a first 5-60 minutes, or a first 10-50 minutes, or a first 15-40 minutes, or a first 20-30 minutes of the contacting and the exposing than that by exposing the aqueous solution to the UV irradiation for the same amount of time without contacting the aqueous solution with the carbon nanotubes to adsorb the para-xylene.

In other embodiments, the hydrocarbon contaminated fluid is an aqueous solution, the at least one single ring aromatic hydrocarbon is para-xylene, and the method reduces the concentration of para-xylene in the aqueous solution by at least 10%, by at least 20%, by at least 30%, by at least 40%, or by at least 50% in less time than a substantially similar method without contacting the aqueous solution with the carbon nanotubes.

In some embodiments, the hydrocarbon contaminated fluid is an aqueous solution, the at least one single ring aromatic hydrocarbon is para-xylene, and the reduced concentration of the para-xylene in the treated aqueous solution is at least about 40% lower, at least about 50% lower, at least about 60% lower, at least about 70% lower, at least about 80% lower, or at least about 90% lower after a first 5-60 minutes, or a first 10-50 minutes, or a first 15-40 minutes, or a first 20-30 minutes of the contacting and the exposing than that by contacting the aqueous solution with the carbon nanotubes to adsorb the para-xylene for the same amount of time without exposing the aqueous solution and the carbon nanotubes to the UV irradiation.

In other embodiments, the hydrocarbon contaminated fluid is an aqueous solution, the at least one single ring aromatic hydrocarbon is para-xylene, and the method reduces the concentration of para-xylene in the aqueous solution by at least 10%, by at least 20%, by at least 30%, by at least 40%, or by at least 50% in less time than a substantially similar method without exposing the aqueous solution and the carbon nanotubes to the UV irradiation.

A plurality of the carbon nanotubes can be pressed, molded, or packaged into a variety of forms, either alone or in combination with other materials (e.g. ABS plastic, a fabric, etc) to facilitate removal of the single ring aromatic hydrocarbon(s) from the hydrocarbon contaminated fluid and/or removal of the carbon nanotubes from the treated fluid when the adsorption is complete, and/or when the adsorption capacity of the carbon nanotubes is exhausted and the carbon nanotubes need to be regenerated. Non-limiting examples of the forms include a granule, a pellet, a sphere, a powder, a woven fabric, a non-woven fabric, a mat, a felt, a block, and a honeycomb.

In some embodiments, the contacting forms adsorbed carbon nanotubes comprising at least one single ring aromatic hydrocarbon and the method further comprises removing the adsorbed carbon nanotubes from the treated fluid. For example, the carbon nanotubes in powder form may be injected into a storage tank of the hydrocarbon contaminated fluid containing the single ring aromatic hydrocarbon(s) and then removed from the treated fluid by filtration, centrifugation, or settling. The carbon nanotubes in fiber form may be inserted in a section of the hydrocarbon contaminated fluid (e.g. waste water) treatment, piping or trench, and be removed for regeneration when its adsorption capacity has been exhausted and replaced by fresh carbon nanotubes. In some embodiments, the carbon nanotubes may comprise a magnetic material, for example, maghemite nanoparticles, as disclosed by Il Tae Kim and Rina Tannenbaum, Magnetic Carbon Nanotubes: Synthesis, Characterization and Anisotropic Electrical Properties, Intech, ISBN 978-953-307-499-3, Published: Jul. 27, 2011 (DOI: 10.5772/22636), and incorporated herein by reference in its entirety, such that the adsorbed carbon nanotubes having the magnetic material can be easily removed from the treated fluid with a magnet.

In one embodiment, the method further comprises regenerating the adsorption ability of the adsorbed carbon nanotubes after removing the adsorbed carbon nanotubes from the treated fluid. In some embodiments, the regenerating the adsorption ability of the adsorbed carbon nanotubes comprises heating the adsorbed carbon nanotubes at about 80-300° C., preferably at about 90-250° C., preferably at about 100-200° C., or preferably at about 100-150° C. for 10-40 hours, for 15-35 hours, or for 20-30 hours, to desorb the at least one single ring aromatic hydrocarbon. In some embodiments, the carbon nanotubes undergo 1-10 cycles, or 2-8 cycles, or 3-7 cycles, or 4-6 cycles, of regeneration-reuse without a significant loss of the adsorption capacity for the single ring aromatic hydrocarbon(s).

In another embodiment, the method of removing at least one single ring aromatic hydrocarbon from a hydrocarbon contaminated fluid may take a form of continuous and/or multi-stage adsorption with the carbon nanotubes accompanied by the exposure of the hydrocarbon contaminated fluid and the carbon nanotubes to the UV irradiation. For example, multiple fixed bed columns or reactors of the carbon nanotubes or, more broadly, multiple adsorption units of any suitable modes or configurations and their combinations, e.g. batch adsorption, fixed bed reactor, cartridge, fluidized bed reactor, etc., can be set up to adsorb the single ring aromatic hydrocarbon(s) from the hydrocarbon contaminated fluid in a parallel and/or sequential manner. In some embodiments, the adsorption columns, reactors, or units set up in the parallel fashion may be standby columns, reactors, or units ready to replace another set of parallel columns, reactors, or units whose adsorption capacity has been exhausted to make the removal operation continuous. The carbon nanotubes in replaced columns, reactors, or units may be regenerated and reused. In other embodiments, the adsorption columns, reactors, or units set up in the sequential or serial fashion allow the single ring, aromatic hydrocarbon(s) to be adsorbed from the hydrocarbon contaminated fluid through multiple stages to achieve a high removal efficiency.

The UV oxidation, and degradation of the single ring aromatic hydrocarbons, such as benzene, toluene, ethylbenzene, and xylene, may be increased by the presence of $H_2O_2$ in the hydrocarbon contaminated fluid due to the conversion of $H_2O_2$ by the UV irradiation into highly reactive hydroxyl radicals that oxidize and degrade the single ring aromatic hydrocarbons, as disclosed by Mahmoud Bahmani, Vahidreza Bitarafhaghighi, Kiumars Badr, Peyman Keshavarz, Dariush Mowla, The photocatalytic degradation and kinetic analysis of BTEX components in polluted wastewater by UV/$H_2O_2$-based advanced oxidation, Desalination and Water Treatment, Volume 52, Issue 16-18, 2014, incorporated herein by reference in its entirety. In one embodiment, the fluid is pre-treated with $H_2O_2$ before contacting the carbon nanotubes and being exposed to the UV irradiation. In another embodiment, the fluid is treated with $H_2O_2$ while contacting the carbon nanotubes and being exposed to the UV irradiation. In still another embodiment, the fluid is pretreated with $H_2O_2$, and is treated with additional $H_2O_2$ while contacting the carbon nanotubes and being exposed to the UV irradiation to replace the consumed $H_2O_2$ and keep a $H_2O_2$ concentration of at least 40%, at least 50%, at least 60%, at least 70%, or at least 80% of the initial $H_2O_2$ concentration. Since $H_2O_2$ is thermodynamically unstable and decomposes to form water and oxygen ($2H_2O_2 \rightarrow 2H_2O + O_2$), with the rate of decomposition increasing with rising temperature, concentration and pH, the removal method may be preferably performed at a low ambient temperature (e.g. 4-30° C., preferably 10-25° C., or preferably 15-20° C.) and/or under a high pressure condition to inhibit $H_2O_2$ decomposition and/or keep $O_2$ from escaping from the fluid, e.g. under a pressure greater than an ambient pressure of about 1 bar, such as 2-100 bar, or 5-90 bar, or 10-80 bar, or 15-70 bar, or 20-60 bar, or 30-50 bar. The fluid may be treated with $H_2O_2$ by adding a $H_2O_2$ containing solution to the fluid, or by pumping or injecting a $H_2O_2$ containing solution or vapor into the fluid. The initial concentration of the $H_2O_2$ in the hydrocarbon contaminated fluid may be about 0.2-4 g/L, about 0.4-3 g/L, or about 0.6-2 g/L. The pH of the hydrocarbon contaminated fluid is preferably in the acidic range of about 1-6, preferably about 2-5, or more preferably about 3.

In one embodiment, the disclosed method is performed with the hydrocarbon contaminated fluid treated with $O_3$ or a mixture of $O_2$ and $O_3$ to increase the UV oxidation and degradation of the single ring aromatic hydrocarbons, such as benzene, toluene, ethylbenzene, and xylene, in the fluid through increased production of highly reactive hydroxyl radicals, as disclosed by Katarína Šilhárová, Ján Derco, Peter Tölgyessy, Mária Valičková, Michal Melicher, Reducing of organic petroleum compounds in water by ozonation/UV processes, 45th International Petroleum Conference, Jun. 13, 2011, Bratislava, Slovak Republic, incorporated herein by reference in its entirety. In some embodiments, $O_3$ or a mixture of $O_2$ and $O_3$ is injected into the fluid before and/or while the fluid contacts the carbon nanotubes and is exposed to the UV irradiation. In some embodiments, the concentration of $O_3$ in the hydrocarbon contaminated fluid is about 0.1-5 mg/L, about 0.2-4.5 mg/L, about 0.5-4 mg/L, about 0.8-3 mg/L, or about 1-2 mg/L.

In the presence of $TiO_2$ or $Mn$—$TiO_2$, a photocatalyst, the UV oxidation and degradation of the single ring aromatic hydrocarbons in the hydrocarbon contaminated fluid may be increased through the production of superoxide anion radicals ($O_2^-$.) and hydroxyl radicals that oxidize and degrade the single ring aromatic hydrocarbons, such as m-xylene, as disclosed by Yi-Ting Wu, Yi-Hui Yu, Van-Huy Nguyen, Kung-Te Lu, Jeffrey Chi-Sheng Wu, Luh-Maan Chang, Chi-Wen Kuo, Enhanced xylene removal by photocatalytic oxidation using fiber-illuminated honeycomb reactor at ppb level, Journal of Hazardous Materials 262 (2013) 717-725, incorporated herein by reference in its entirety. In some embodiments, the carbon nanotubes comprise carbon nanotubes coated with $TiO_2$. The methods for preparing $TiO_2$-coated carbon nanotubes have been disclosed by Chinese Patent No. CN101318646 B; by Yuan Yao, Gonghu Li, Shannon Ciston, Richard M. Lueptow and Kimberly A. Gray, Photoreactive $TiO_2$/Carbon Nanotube Composites: Synthesis and Reactivity, Environ. Sci. Technol., 2008, 42 (13), pp 4952-4957; and by Ye Cong, Xuanke Li, Yuri Qin, Zhijun Dong, Guamning Yuan, Zhengwei Cui, Xiaojun Lai, Carbon-doped $TiO_2$ coating on multiwalled carbon nanotubes with higher visible light photocatalytic activity, Applied Catalysis B: Environmental, Volume 107, Issues 1-2, 31 Aug. 2011, Pages 128-134; each incorporated herein by reference in its entirety. In other embodiments, the $TiO_2$-coated carbon nanotubes may be further processed by an impregnation method in the presence of a precursor of $Mn(NO_3)_2.xH_2O$ to form a $Mn$—$TiO_2$ coating on the carbon nanotubes. For example, the $TiO_2$ coated carbon nanotubes may be soaked in a $Mn(NO_3)_2$ solution, preferably under sonication for 5-20 minutes, and then heated at 60-100° C. to evaporate the $Mn(NO_3)_2$ solution and be dried. The dried carbon nanotubes are subsequently calcined in air at a temperature of 300-550° C. for 2-5 hours. In some embodiments, Mn is present at a concentration of 0.5-10 wt %, preferably 1-8 wt %, preferably 2-6 wt %, or preferably 3-5 wt %, of the total weight of the $Mn$—$TiO_2$ coating.

In one embodiment, the $TiO_2$ or $Mn$—$TiO_2$ forms a film covering an exterior surface and/or an interior surface of the carbon nanotube. In still another embodiment, the $TiO_2$ or $Mn$—$TiO_2$ forms a film sandwiched between surfaces of the carbon nanotube(s).

The coverage of the surfaces of the carbon nanotubes by the film of $TiO_2$ or $Mn$—$TiO_2$ can vary. In some embodiments, the coverage of the surfaces of the carbon nanotubes is about 5-90%, about 10-80%, about 20-60%, or about 30-50%.

Using the $TiO_2$ or $Mn$—$TiO_2$ coated carbon nanotubes in the disclosed method may be advantageous. Firstly, since the carbon nanotubes have a large surface area, the $TiO_2$ or $Mn$—$TiO_2$ coated carbon nanotubes provide a large surface for the coated photocatalyst, enabling the photocatalyst to efficiently interact with the UV light to produce the oxidative radicals oxidizing and degrading the single ring aromatic hydrocarbons. Secondly, the $TiO_2$ or $Mn$—$TiO_2$ coated carbon nanotubes can also adsorb, the single ring aromatic hydrocarbons and/or their oxidation and degradation products. By changing the loading or coverage of $TiO_2$ or $Mn$—$TiO_2$ on the carbon nanotubes, the proportion of the single ring aromatic hydrocarbons removed by UV photocatalytic oxidation versus adsorption by the carbon nanotubes can be varied. The carbon nanotubes with a relatively low coverage of the photocatalyst coating can remove the single ring aromatic hydrocarbons mainly through adsorption, whereas the carbon nanotubes with a relatively high coverage of the photocatalyst coating can remove the single ring aromatic hydrocarbons mainly through UV photocatalytic oxidation. In one embodiment, the photocatalyst coated carbon nanotubes with different photocatalyst loadings or coverages may be packed in a fixed bed column or reactor in such way that a photocatalyst loading gradient is formed in the resulting carbon nanotube column or fixed bed reactor along the flow direction of the hydrocarbon contaminated fluid. In one embodiment, the fluid contacts a section of the carbon nanotube column with a lower loading of the photocatalyst first and then contacts the subsequent sections of the carbon nanotube column with increasing loadings of the photocatalyst as it passes through the column with the photocatalyst loading gradient. The UV light intensity or power may be adjusted in accordance with the photocatalyst loading gradient, with more power delivered to a column section with a higher photocatalyst loading. UV LEDs are particularly suited to accomplish this, because they have a tight emission angle and their UV output can be focused directly to where it is required. This is a preferred embodiment when the absorption efficiency and/or rate of the single ring aromatic hydrocarbons with the carbon nanotubes increase with increasing concentrations of the single ring aromatic hydrocarbons in the hydrocarbon contaminated fluid. In another embodiment, the photocatalyst coated carbon nanotubes of a fixed photocatalyst loading may be mixed with non-photocatalyst coated carbon nanotubes at different ratios to obtain mixed carbon nanotubes with different overall photocatalyst loadings. A similar fixed bed column with a photocatalyst loading gradient along the flow direction of the hydrocarbon contaminated fluid can be formed by packing the column with the mixed carbon nanotubes.

In some embodiments, the hydrocarbon contaminated fluid is contacted with the carbon nanotubes while the hydrocarbon contaminated fluid and the carbon nanotubes are exposed to the UV irradiation at a temperature of about 4-100° C., preferably about 10-90° C., preferably about 15-80° C., preferably about 20-70° C., or preferably about 25-60° C., or preferably 20-30° C.

In some embodiments, the hydrocarbon contaminated fluid is contacted with the carbon nanotubes while hydrocarbon contaminated fluid and the carbon nanotubes are exposed to the UV irradiation at, a pressure of about 0.1-100 bar, about 0.5-80 bar, preferably about 1-60 bar, preferably about 1-40 bar, preferably about 1-20 bar, or preferably about 0.5-1.5 bar.

The concentration of the single ring aromatic hydrocarbons in the hydrocarbon contaminated fluid and/or in the treated fluid can be determined by various methods well known in the art, non-limiting examples of which include GC-MS (See Katarína Šilhárová, Ján Derco, Peter Tölgyessy, Mária Valičková, Michal Melicher, Reducing of organic petroleum compounds in water by ozonation/UV processes, 45th International Petroleum Conference, Jun. 13, 2011, Bratislava, Slovak Republic, incorporated herein by reference in its entirety), GC/self-ion molecule reaction (SIMR)/MS/MS (GC/SIMR/MS/MS) (See Chih-Hao Yang, Nadeem Ahmad Khan, Hui-Fen Wu, Differentiation and quantification of xylene isomers by combining headspace solid-phase microextraction/gas chromatography and self-ion molecule reaction in an ion trap tandem mass spectrometry, Journal of Separation Science, Volume 31, Issue 16-17, September 2008, Pages 3050-3057, incorporated herein by reference in its entirety), GC-FID (See H. Jurdáková, A. Kraus, W. Lorenz, R. Kubinec, Ž. Krkošová, J. Blaško, I. Ostrovský, L. Soják, V. Pacáková, Determination of gasoline and BTEX in water samples by gas chromatography with direct aqueous injection, Petroleum & Coal 47 (3), 49-53, 2005, incorporated herein by reference in its entirety), and chemometric Raman analysis (See Real-Time Xylene Isomer Quantification Using Chemometric Raman Analysis from Princeton Instruments, incorporated herein by reference in its entirety).

Having generally described this invention, a further understanding can be obtained by reference to certain specific examples which are provided herein fin purposes of illustration only and are not intended to be limiting unless otherwise specified.

Example 1

Materials and Methods

1. Materials

Multi-walled carbon nanotubes (CNTs) were purchased from Chengdu Organic Chemicals Co. Ltd with purity of >95% (weight based). Para-xylene (p-xylene) of >99% purity was purchased from Sigma Aldrich and was used as received without any treatment. The light source used was a UV LED having a wavelength of 365 nm and a power of 20 W.

2. Removal of p-Xylene from an Aqueous Solution

Batch adsorption with carbon nanotubes was used for the removal of p-xylene. A plurality of beakers was placed on a magnetic stirrer, with each beaker containing 1000 ml of a freshly prepared p-xylene-water solution that had an initial p-xylene concentration of 100 ppm and an initial pH of 6±0.2 under continuous stirring at 600 rpm and at room temperature. The beakers containing the p-xylene-water solutions were divided into three experimental groups. In the first group, 500 mg of raw CNTs were added to each p-xylene-water solution to adsorb the p-xylene. In the second group, a UV LED was placed on top of each beaker containing the p-xylene solution to expose the p-xylene solution to UV irradiation. In the third group, 500 mg of raw CNTs were added to each p-xylene-water solution to adsorb the p-xylene and a UV LED was placed on top of the beaker containing the p-xylene solution/raw CNTs mixture to expose the p-xylene solution and the raw CNTs to UV irradiation.

The p-xylene solution samples were collected from each experimental group every 30 minutes following the start of the adsorption and/or UV irradiation. The carbon nanotubes were separated from the p-xylene solution where the carbon nanotubes were present for adsorption by settling. 1 μL of each p-xylene solution sample was injected into a gas chromatography-flame ionization detector (GC-FID, Agilent 7890B) to determine the p-xylene concentration in the sample.

The percentage removal of p-xylene was calculated using the following equation:

$$\text{Removal (\%)} = \frac{C_0 - C}{C_0} * 100 \quad (1)$$

where $C_o$ is the initial concentration of p-xylene in, the p-xylene-water solution (mg/l) and C represents the concentration (mg/l) of p-xylene in the p-xylene solution samples collected at various time points.

Example 2

Determination and comparison of p-xylene removal percentages by carbon nanotube adsorption, UV LED irradiation, and a combination of carbon nanotube adsorption and UV LED irradiation 1. Removal of p-Xylene by Carbon Nanotube Adsorption Referring to FIG. 1, 500 mg of the multi-walled carbon nanotubes were added to 1000 ml of the p-xylene water solution with the initial p-xylene concentration at 100 ppm in the first experimental group, and the p-xylene concentration in the solution was determined after 30, 60, 90, and 120 minutes of adsorption by the carbon nanotubes. After 30 minutes of adsorption, about 68% of p-xylene was removed from the solution. After 120 minutes of adsorption, about 97% of p-xylene was removed from the solution. The p-xylene removal or adsorption rate with the carbon nanotubes was higher at the beginning of the adsorption process and turned lower as the adsorption progressed to an equilibrium, perhaps due to the availability of a large number of vacant adsorption sites on the surface of the carbon nanotubes at the beginning of the adsorption, and due to the reduced availability or saturation of the adsorption sites on the surface of the carbon nanotubes and the repulsion force between the p-xylene molecules adsorbed on the carbon nanotubes and the free p-xylene molecules remaining in the p-xylene water solution as the adsorption progressed.

2. Removal of p-Xylene by UV Irradiation with a UV LED

Figure 1:
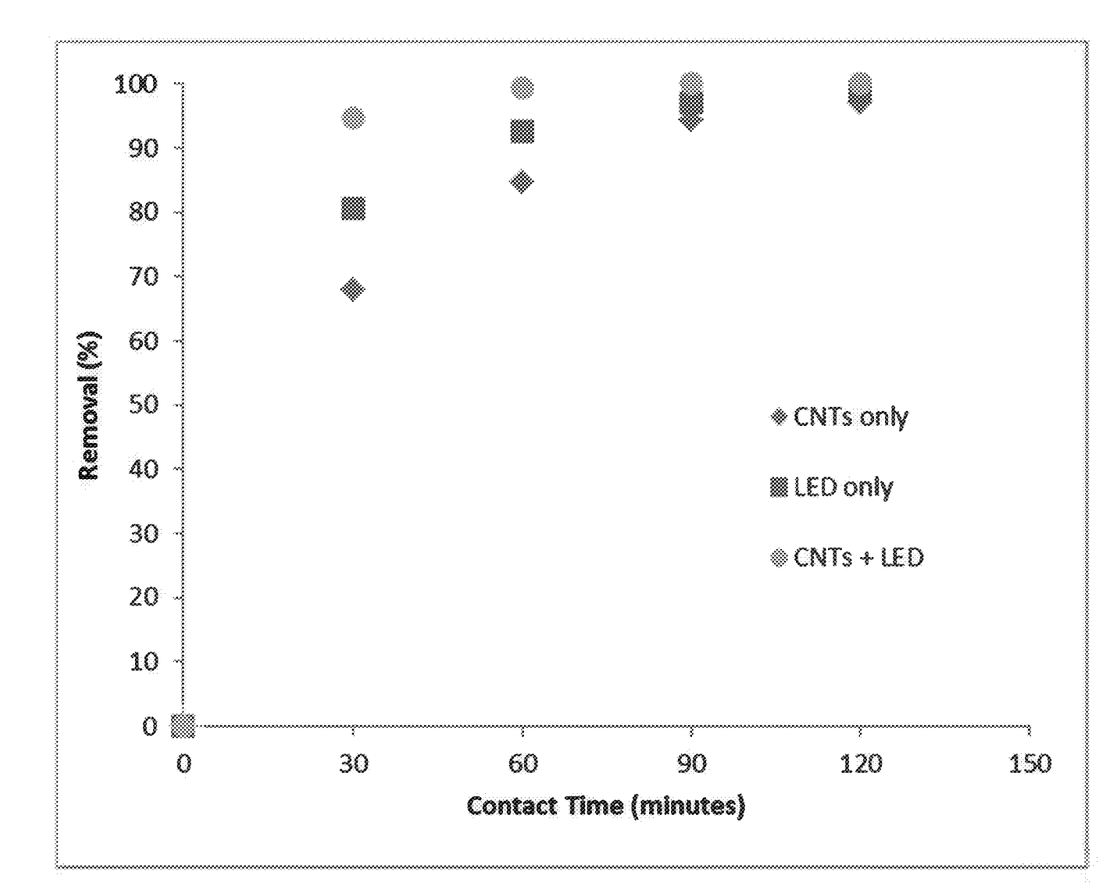
FIG. 1 is a graphical presentation of the percentage of p-xylene removed from an aqueous solution with time by adsorption with carbon nanotubes (CNTs) only, by UV irradiation only with a UV LED, or by a combination of adsorption with carbon nanotubes and UV irradiation with a UV LED according to Example 2.

Referring to FIG. 1, the p-xylene water solutions with the initial p-xylene concentration at 100 ppm in the second experimental group were exposed to UV irradiation with a UV LED, and the p-xylene concentration in the solution was determined after 30, 60, 90, and 120 minutes of UV irradiation. After 30 minutes of the UV irradiation, 81% of p-xylene was removed or degraded. After 120 minutes of the UV irradiation, 99% of p-xylene was removed. The p-xylene removal rate with the UV irradiation was higher at the beginning of the irradiation process and turned lower as the irradiation process progressed, probably because a large number of p-xylene molecules were present in the solution and were exposed to the UV irradiation and degraded at the beginning of the UV irradiation process, and as the UV irradiation progressed, a decreasing number of p-xylene molecules interacted with the UV irradiation and were degraded.

3. Removal of p-Xylene by a Combination of Carbon Nanotube Adsorption and UV LED Irradiation Referring to FIG. 1, 500 mg of the multi-walled carbon nanotubes were added to each of the p-xylene water solutions with the initial p-xylene concentration at 100 ppm in the third experimental group to adsorb the p-xylene, while at the same time the p-xylene water solution and the multi-walled carbon nanotubes were exposed to UV irradiation with a UV LED. The p-xylene concentration in the solution was determined after 30, 60, 90, and 120 minutes of the combined treatment of the adsorption by the carbon nanotubes and the UV irradiation. After 30 minutes of the combined treatment, about 95% of p-xylene was removed from the solution, more than the percentage of p-xylene removed by the adsorption with the carbon nanotubes alone or by the UV irradiation alone with the UV LED for the same amount of time. After 120 minutes of the combined treatment, 100% of p-xylene was removed from the solution.

The invention claimed is:

1. A method of removing para-xylene from a hydrocarbon contaminated aqueous solution, comprising:
contacting the hydrocarbon contaminated aqueous solution with unmodified multiwalled carbon nanotubes in the presence of oxygen to adsorb the para-xylene while exposing the hydrocarbon contaminated aqueous solution and the unmodified multiwalled carbon nanotubes to UV irradiation from at least one LED UV light source with a wavelength of about 315-415 nm to form a treated fluid having a reduced concentration of para-xylene relative to the hydrocarbon contaminated aqueous solution.

2. The method of claim 1,
wherein the method reduces the concentration of para-xylene in the aqueous solution by at least 30% in less time than a substantially similar method without contacting the aqueous solution with the carbon nanotubes.

3. The method of claim 1,
wherein the method reduces the concentration of para-xylene in the aqueous solution by at least 30% in less time than a substantially similar method without exposing the aqueous solution and the carbon nanotubes to the UV irradiation.

4. The method of claim 1,
wherein the reduced concentration of the para-xylene in the treated fluid is at least 95% reduced relative to the hydrocarbon contaminated fluid.

5. The method of claim 1, wherein the unmodified multiwalled carbon nanotubes have an outer diameter ranging from about 8 nm to 80 nm.

6. The method of claim 1, wherein the amount of the unmodified multiwalled carbon nanotubes contacting the hydrocarbon contaminated aqueous solution ranges from about 0.2 g/L to 1 g/L of the hydrocarbon contaminated aqueous solution.

7. The method of claim 1, wherein the hydrocarbon contaminated aqueous solution has a pH of about 6-8 before the contacting and the exposing.

8. The method of claim 1, wherein the hydrocarbon contaminated aqueous solution is contacted with the unmodified multiwalled carbon nanotubes while the hydrocarbon contaminated aqueous solution and the unmodified multiwalled carbon nanotubes are exposed to the UV irradiation at a temperature of about 20-30° C. and a pressure of about 0.5-1.5 bar.

9. The method of claim 1, wherein a plurality of the unmodified multiwalled carbon nanotubes is in a powder form.

* * * * *